(12) United States Patent
Liu et al.

(10) Patent No.: US 12,681,791 B2
(45) Date of Patent: Jul. 14, 2026

(54) BMC/BIOS RAS SYSTEM

(71) Applicant: Dell Products L.P., Round Rock, TX (US)

(72) Inventors: Wei Liu, Austin, TX (US); Ching-Lung Chao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/935,864

(22) Filed: Nov. 4, 2024

(65) Prior Publication Data

US 2026/0127064 A1     May 7, 2026

(51) Int. Cl.
G06F 11/07 (2006.01)

(52) U.S. Cl.
CPC ...... G06F 11/0772 (2013.01); G06F 11/0778 (2013.01); G06F 11/079 (2013.01)

(58) Field of Classification Search
CPC . G06F 11/0772; G06F 11/0778; G06F 11/079
See application file for complete search history.

(56) References Cited

U.S. PATENT DOCUMENTS

| | | | |
|---|---|---|---|
| 2021/0041933 A1* | 2/2021 | Bartlett | G06F 30/34 |
| 2021/0133127 A1* | 5/2021 | Shi | G06F 11/141 |
| 2021/0240241 A1* | 8/2021 | Knapton | G06F 1/10 |
| 2023/0152984 A1* | 5/2023 | Moon | G06F 11/0727 |
| | | | 711/103 |
| 2024/0028729 A1 | 1/2024 | Liu | |
| 2024/0289243 A1* | 8/2024 | Yuan | G06F 11/0757 |
| 2025/0004878 A1* | 1/2025 | Zhao | G06F 11/106 |

* cited by examiner

*Primary Examiner* — Bryce P Bonzo
*Assistant Examiner* — Xinyuan Yu
(74) *Attorney, Agent, or Firm* — Joseph Mencher

(57) ABSTRACT

A BMC/BIOS RAS system includes a computing device including a processing system coupled to a BMC device and a computing component. A host processing device in the processing system identifies that the computing component has reached a first error threshold and, in response, notifies the BMC device. In response to being notified, the BMC device identifies and stores error telemetry data associated with at least one error that occurred in the computing component. One of the host processing device or the BMC device identifies that the computing component has reached a second error threshold and, in response, notifies a BIOS included in the processing system. In response to being notified the BIOS identifies and logs that the computing component has reached the second error threshold.

20 Claims, 13 Drawing Sheets

BMC/BIOS RAS SYSTEM

BACKGROUND

The present disclosure relates generally to information handling systems, and more particularly to using a Baseboard Management Controller (BMC) device and a Basic Input/Output System (BIOS) to perform Reliability, Availability and Serviceability (RAS) operations for an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, networking devices (e.g., switch devices), storage systems, and/or other computing devices known in the art, often perform Reliability, Availability, and Serviceability (RAS) operations that generally provide for the monitoring of the operation of their components to identify errors and other issues with those components and generate logs for those errors and other issues, which may allow for the analysis of failures or other unavailability of those components, as well as the prediction or other determination of future unavailability of those components. For example, consider conventional RAS operations performed for a memory device in a server device. In the event a correctable error occurs in the memory device, that correctable error may be identified by the Central Processing Unit (CPU) in the server device and, in response, the CPU may generate an System Management Interrupt (SMI) to pass control of the server device to a Basic Input/Output System (BIOS) in the server device.

In response to the SMI, the BIOS may identify the correctable error that occurred in the memory device, log the occurrence of that correctable error in a Baseboard Management Controller (BMC) in the server device, and in some situations transmit a corresponding error warning message to the CPU that may cause the CPU to perform an error action (e.g., performing memory mirroring or memory sparing), and/or transmit a corresponding error warning message to an operating system provided by the server device that may cause the operating system to perform an error action (e.g., performing page off-lining or Post Package Repair (PPR)). As will be appreciated by one of skill in the art in possession of the present disclosure, in order to generate a relatively complete record of correctable errors that occur in memory devices, as well as perform appropriate error actions in response to one or more correctable errors, such conventional RAS operations require many SMIs.

As will be appreciated by one of skill in the art in possession of the present disclosure, the SMI provisioning operations by the CPU discussed above have an associated latency that results from the need for the CPU to prepare to enter a System Management Mode (SMM) in which the BIOS may perform the operations described above, enter that SMM, and then exit that SMM once the BIOS has completed the operations described above, and such latency scales with the number of processor cores in the CPU that must each enter and exit the SMM. Furthermore, while the CPU is in the SMM, operating system runtime issues can occur such as, for example, network packet losses, Watch Dog Timer (WDT) timeouts, and/or other SMM issues that would be apparent to one of skill in the art in possession of the present disclosure. Further still, a BIOS SMI handler in the BIOS that handles the SMIs discussed above is relatively complex piece of code, and the SMM described above is a relatively privileged mode of the computing device that can raise security concerns, as malicious parties can (and have) exploited the ability to trigger SMIs and enter the SMM to gain unauthorized access to critical components in the computing device.

A solution to the issues described above has been proposed, and provides for the handling of RAS operations by the BMC in the server device discussed above. In the proposed solution, a correctable error will be identified by the Central Processing Unit (CPU) in the server device and, in response, the CPU will notify the BMC in the server device. In response to the notification, the BMC will identify the correctable error that occurred in the memory device, log the occurrence of that correctable error, and in some situations transmit a corresponding error warning message to the CPU that may cause the CPU to perform an error action (e.g., performing memory mirroring or memory sparing), and/or transmit a corresponding error warning message to an operating system provided by the server device that may cause the operating system to perform an error action (e.g., page off-lining or PPR). As will be appreciated by one of skill in the art in possession of the present disclosure, the BMC operations described above will require relatively complex programming in the BMC.

However, while the BMC RAS "offload" of RAS operations from the BIOS described above eliminates SMIs and associated CPU SMM entries/exits, the inventors of the present disclosure have recognized that such BMC RAS offloading will be subject to several issue. For example, achieving a unified design/common solution by CPU providers that transitions their CPUs to providing that BMC RAS offload (i.e., notifying the BMC in place of the BIOS) will be a difficult task and will take a relatively long time.

Furthermore, some memory devices (e.g., Double Data Rate 5 (DDR5) memory devices) include an "on-die" Error Correction Code (ECC) engine that is configured to correct correctable errors that occur on that memory device, and that is provided on relatively high-density memory devices to ensure relatively higher reliability and protect data on those memory devices. Such "error-correcting" memory devices are used in server devices that include a BIOS that is configured to perform conventional RAS operations that are similar to those described above, but with the exception that the BIOS performs those conventional RAS operations based on error thresholds (e.g., the CPU may identify when an error threshold has been reached and provide a SMI to the BIOS, and the BIOS may identify that error threshold has been reached and log the reaching of that error threshold in the BMC). The inventors of the present disclosure have observed that correctable errors occurring in the "error-correcting" memory devices discussed above do not reach the error threshold discussed above frequently, thus reducing the need for the BMC RAS offload described above due to the reduction of SMIs and associated CPU SMM entries/exits.

However, correctable errors in such "error-correcting" memory devices continue to occur, and the lack of error logs of those correctable errors in server devices that utilize such "error-correcting" memory devices prevents or limits analysis of such correctable errors that could otherwise be used to predict the future memory device unavailability, root cause analysis of memory device unavailability, and/or correctable error analysis results discussed above.

Accordingly, it would be desirable to provide a RAS system that addresses the issues discussed above.

SUMMARY

According to one embodiment, an Information Handling System (IHS) includes a processing system including a host processing device and a Basic Input/Output System (BIOS); and a memory system that is coupled to the processing system and that includes instructions that, when executed by the host processing device, cause the host processing device to provide a host processing engine that is configured to: identify that a computing component that is coupled to the processing system has reached a first error threshold; notify, in response to identifying that the computing component has reached the first error threshold, a Baseboard Management Controller (BMC) device that is coupled to the processing system to cause the BMC device to identify and store error telemetry data associated with at least one error that occurred in the computing component; identify that the computing component has reached a second error threshold; and notify, in response to identifying that the computing component has reached the second error threshold, the BIOS, wherein memory system includes instructions that, when executed by the BIOS, cause the BIOS to provide a BIOS engine that is configured to: identify and log, in response to being notified, that the computing component has reached the second error threshold.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
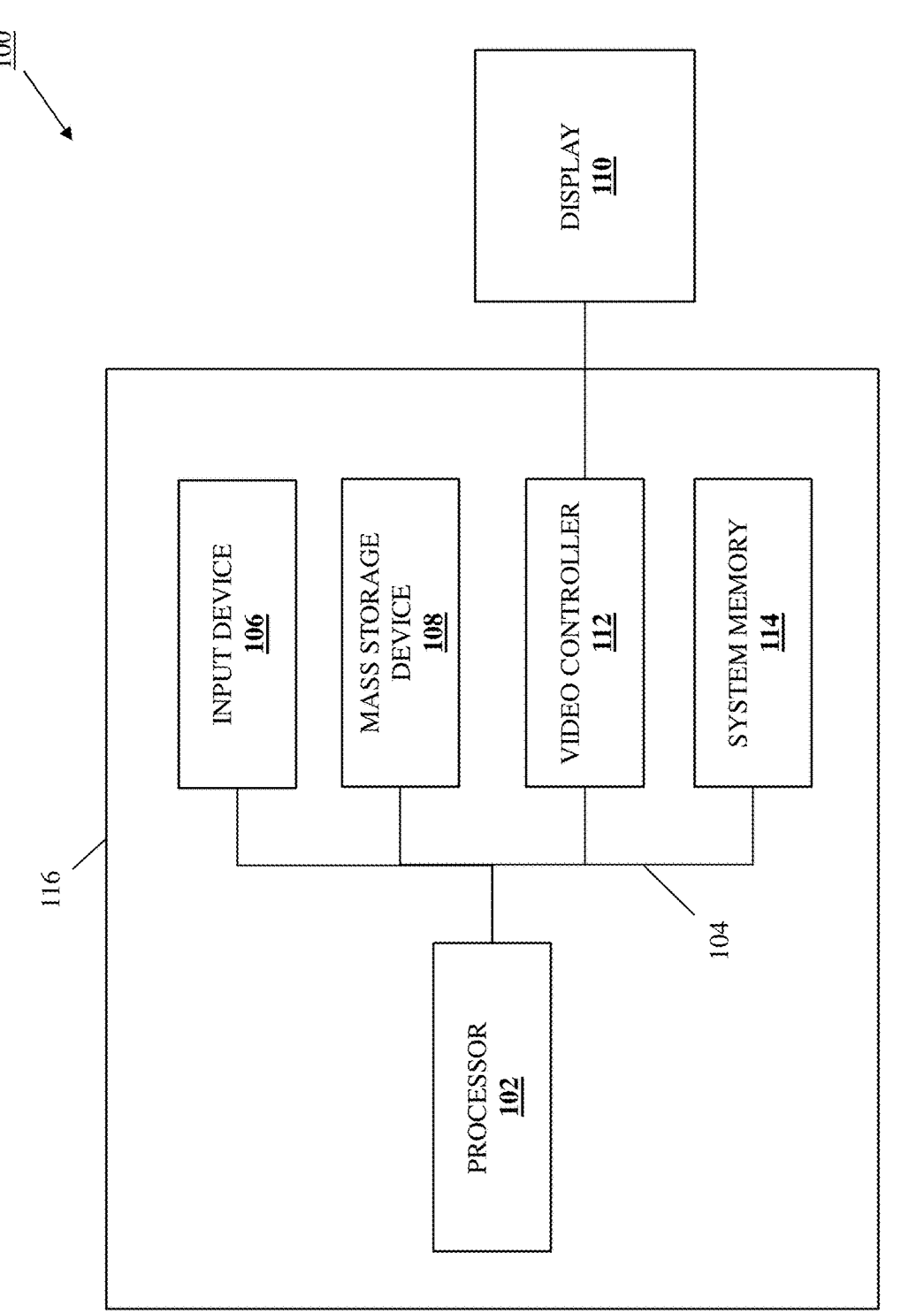
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
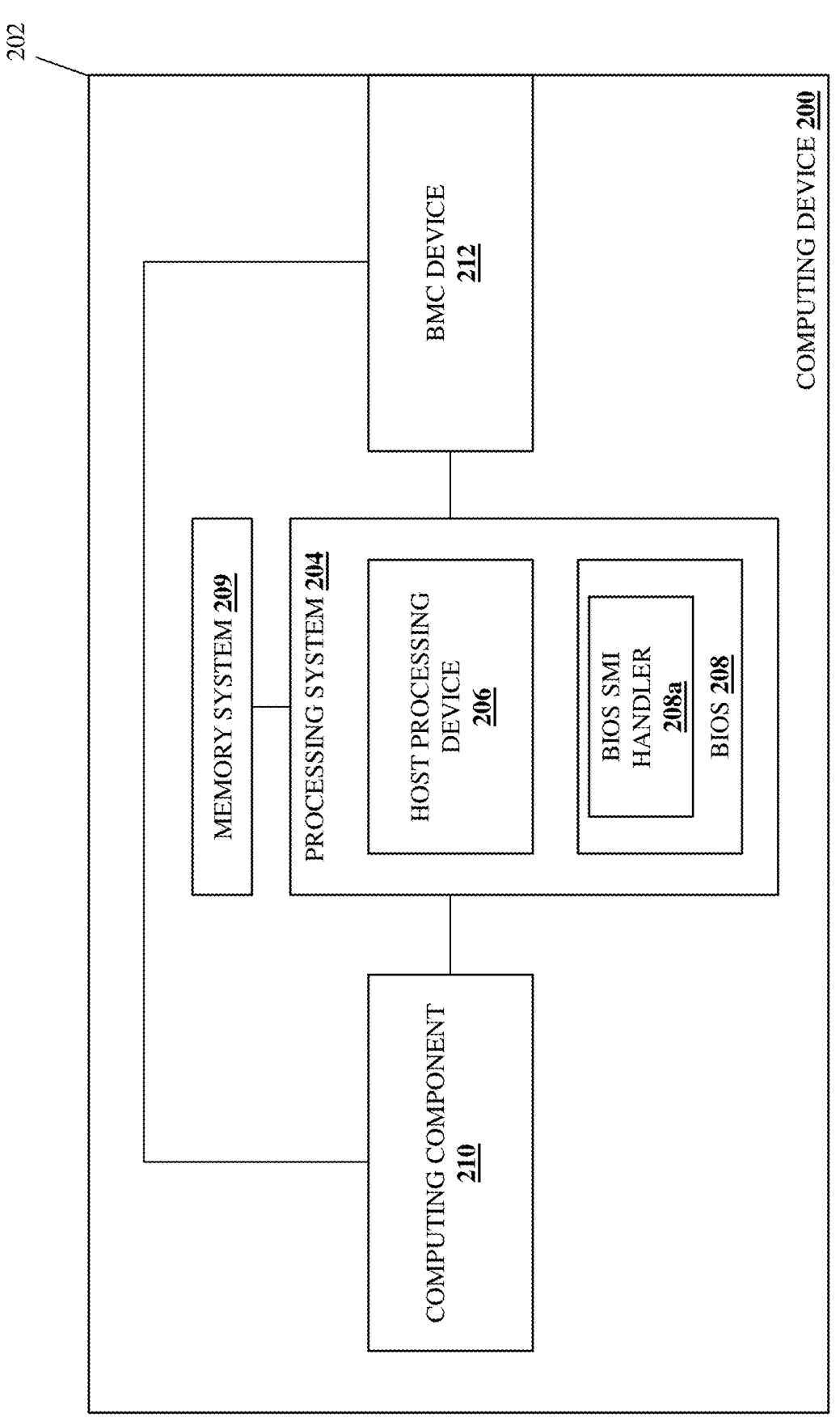
FIG. 2 is a schematic view illustrating an embodiment of a computing device that may provide the BMC/BIOS RAS system of the present disclosure.

Referring now to FIG. 2, an embodiment of a computing device 200 is illustrated that may provide the BMC/BIOS RAS system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by networking devices (switch devices), storage systems, and/or other computing devices that are configured to operate similarly as the computing device 200 discussed below.

In the illustrated embodiment, the computing device 200 includes a chassis 202 that houses the components of the computing device 200, only some of which are illustrated and describe below. For example, the chassis 202 may house a processing system 204 that, in the illustrated embodiments, includes a host processing device 204a (e.g., which may include the processor 102 discussed above with reference to FIG. 1 such as, for example, a Central Processing Unit (CPU), and may include a memory controller and/or other unillustrated processor components that enable the functionality described below) and a Basic Input/Output System (BIOS) 208 that include a BIOS System Management Interrupt (SMI) handler 208a. As will be appreciated by one of skill in the art in possession of the present disclosure, the BIOS 208 may be configured to perform hardware initialization during boot or other initialization of the computing device 200, as well as provide runtime services for an operating system and other applications provided by the computing device 200. The chassis 202 also houses a memory system 209 (e.g., which may include the memory 114 discussed above with reference to FIG. 1 such as, for example, Dynamic Random Access Memory (DRAM), BIOS firmware memory, and/or other memory known in the art) that is coupled to the processing system 204.

The memory system 209 (e.g., the DRAM discussed above) may include instructions that, when executed by the host processing device 206, cause the host processing device 206 to provide a host processing engine that is configured to perform the functionality of the host processing engines, the host processing subsystems, and/or computing devices discussed below. The memory system 208 (e.g., the BIOS firmware memory) may also include instructions that, when executed by a BIOS firmware processor that is included in the BIOS 208, cause the BIOS to provide a BIOS engine that is configured to perform the functionality of the BIOS engines, the BIOS subsystems, the BIOS SMI handler 208a, and/or computing devices discussed below.

The chassis 202 may also house a computing component 210 that is coupled to the processing system 204. In the examples described below, the computing component 210 is described as being provided by a memory device such as the Double Data Rate 5 (DDR5) memory devices described above that include an "on-die" ECC engine that is configured to correct correctable errors that occur on that memory device. As such, while illustrated separate from the memory system 209, one of skill in the art in possession of the present disclosure will appreciate how the computing component

210 may be included in the memory system 209 in some examples (including the specific example provided below). However, while described as being provided by a particular memory device, one of skill in the art in possession of the present disclosure will appreciate how the computing component 210 may be provided by other types of memory devices and/or other types of computing components while remaining within the scope of the present disclosure as well.

The chassis 202 may also house a Baseboard Management Controller (BMC) device 212 that is coupled to the processing system 204 and the computing component 210, and that one of skill in the art in possession of the present disclosure will recognize is configured to provide an Out-Of-Band (OOB) management platform that uses separate resources from the computing device 200 to provide a browser-based interface or Command Line Interface (CLI) for managing and monitoring hardware in the computing device 200. In a specific example, the BMC device 212 may be provided by an integrated DELL® Remote Access Controller (iDRAC) device that is provided in server devices available from DELL® Inc. of Round Rock, Texas, United States, although one of skill in the art in possession of the present disclosure will appreciate how other BMC devices (e.g., BMC devices provided according to the OpenBMC specification promulgated by the OpenBMC project) will fall within the scope of the present disclosure as well.

While not illustrated, one of skill in the art in possession of the present disclosure will appreciate how the BMC device 212 may include a BMC processing system (e.g., similar to the processor 102 discussed above with reference to FIG. 1) and a BMC memory system (e.g., similar to the memory 114 discussed above with reference to FIG. 1) that includes instructions that, when executed by the BMC processing system, cause the BMC processing system to provide a BMC engine that is configured to perform the functionality of the BMC engines, BMC subsystems, and/or BMC devices described below. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the BMC/BIOS RAS functionality discussed below, while remaining within the scope of the present disclosure as well.

Figure 3:
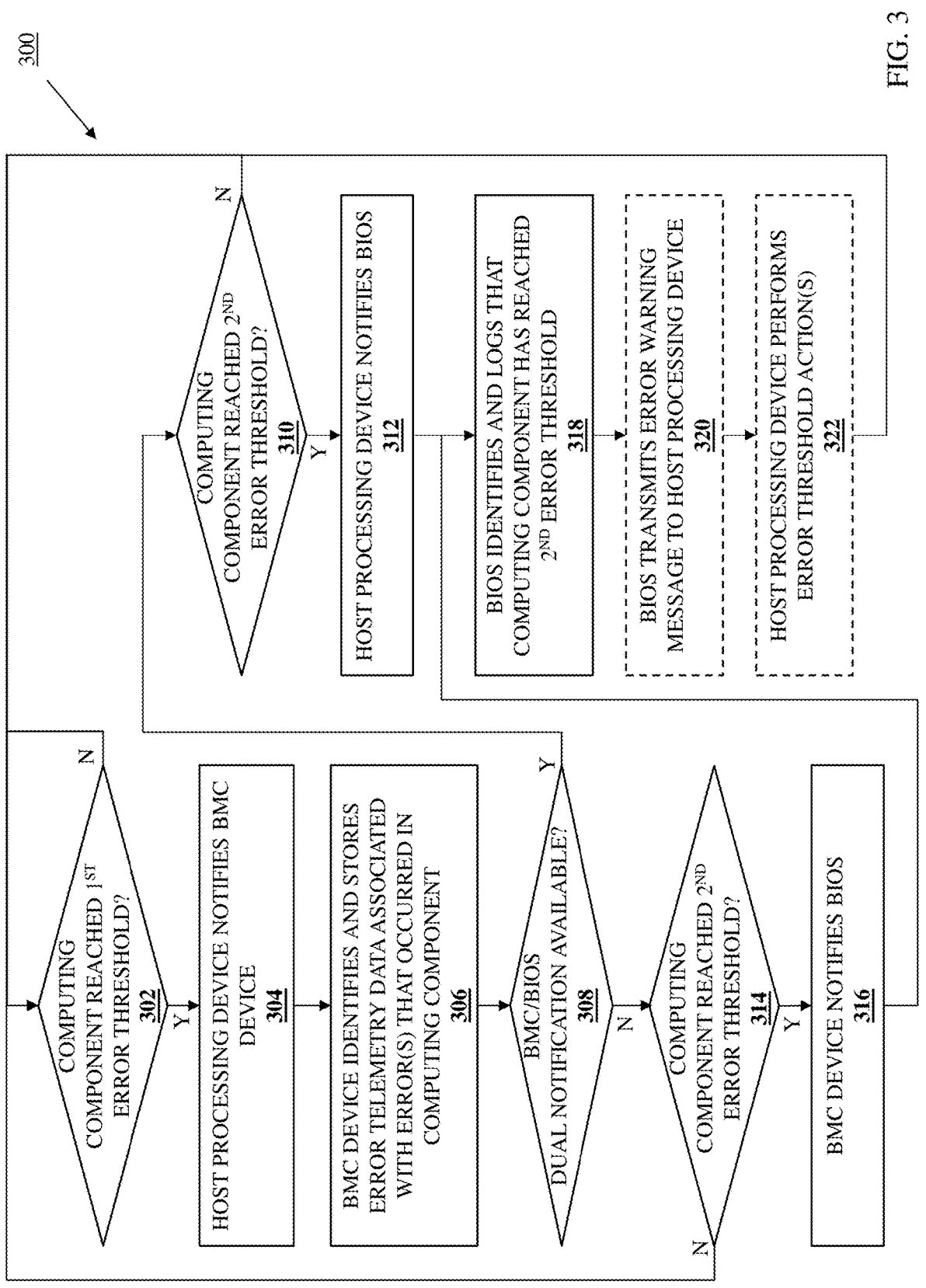
FIG. 3 is a flow chart illustrating an embodiment of a method for performing RAS operations using a BMC and a BIOS in a computing device.

Referring now to FIG. 3, an embodiment of a method 300 for performing Reliability, Availability, and Serviceability (RAS) operations using a Baseboard Management Controller (BMC) and a Basic Input/Output System (BIOS) in a computing device is illustrated. As discussed below, the systems and methods of the present disclosure provide for the performance of RAS operations by a BMC and a BIOS in a computing device, and particularly to the BMC identifying and storing error telemetry data for errors occurring in a computing component while the BIOS identifies and logs when the computing component reaches error threshold(s). For example, the BMC/BIOS RAS system of the present disclosure may include a computing device having a processing system coupled to a BMC device and a computing component. A host processing device in the processing system identifies that the computing component has reached a first error threshold and, in response, notifies the BMC device. In response to being notified, the BMC device identifies and stores error telemetry data associated with at least one error that occurred in the computing component.

One of the host processing device or the BMC device identifies that the computing component has reached a second error threshold and, in response, notifies a BIOS included in the processing system. In response to being notified the BIOS identifies and logs that the computing component has reached the second error threshold. As such, SMIs and associated CPU SMM entries/exits to perform RAS operations are reduced while collecting error information that enables the analysis of errors that allows the prediction of future computing component unavailability, root cause analysis of computing component unavailability, and/or other error analysis results.

Figure 4:
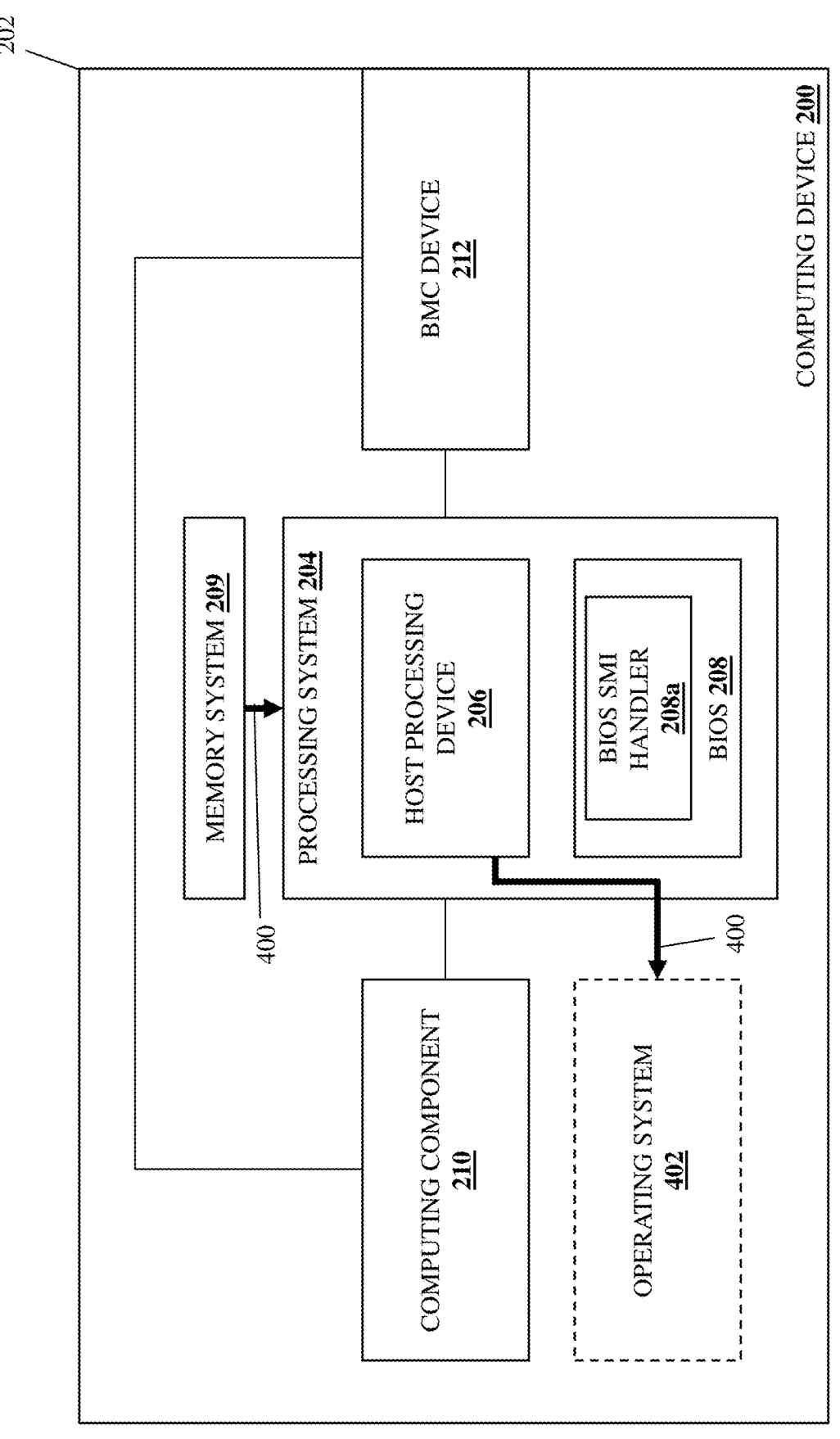
FIG. 4 is a schematic view illustrating an embodiment of the computing device of FIG. 2 operating during the method of FIG. 3.
Figure 5:
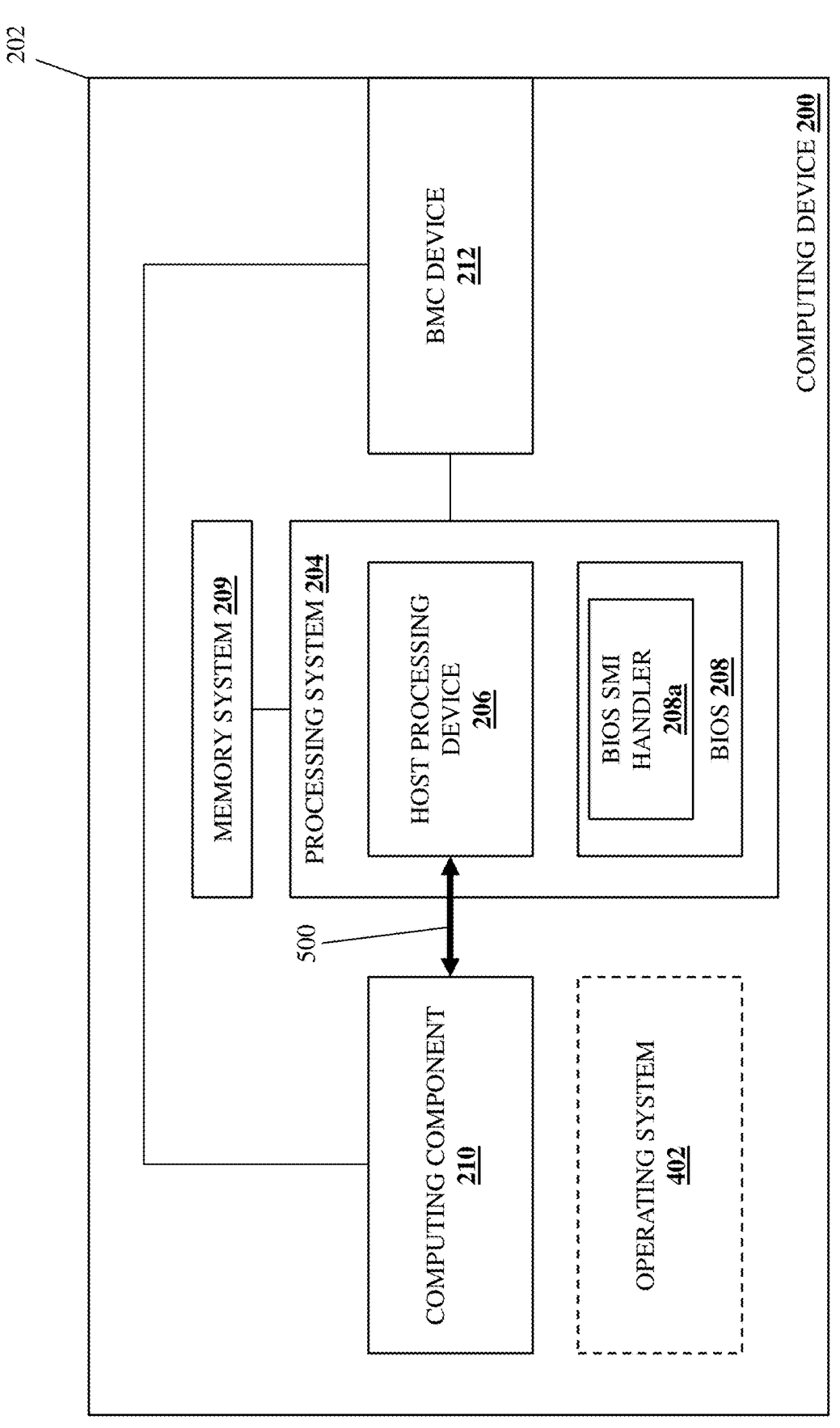
FIG. 5 is a schematic view illustrating an embodiment of the computing device of FIG. 2 operating during the method of FIG. 3.

In the specific examples of the BMC/BIOS RAS system performing the method 300 described below, the computing component that experiences error is a memory device (e.g., the DDR5 memory device described above) that experiences correctable errors and includes an "on-die" ECC engine that is configured to correct those correctable errors, but one of skill in the art in possession of the present disclosure will appreciate how the teachings of present disclosure may be utilized with a variety of computing components experiencing a variety of errors while remaining within the scope of the present disclosure as well. As can be seen in FIG. 4, during or prior to some embodiments of the method 300, the host processing device 206 in the processing system 204 may perform operating system provisioning operations 400 that include executing instructions stored on the memory system 209 to provide an operating system 402 (e.g. following initialization operations by the BIOS 208 that configure the computing device 200 to provide that operating system 402).

The method 300 begins at decision block 302 where the method 300 proceeds depending on whether a computing component has reached a first error threshold. In an embodiment, at decision block 302, a host processing engine provided by the host processing device 206 in the processing system 204 may perform first error threshold identification operations 500 that may include monitoring the computing component 210 to identify whether errors occurring in the computing component 210 has reached a first error threshold. In some examples, the first error threshold (which may be a default error threshold, an error threshold set by a user, and/or any other error thresholds that would be apparent to one of skill in the art in possession of the present disclosure) may be a single error such that the host processing engine provided by the host processing device 206 identifies every error that occurs in the computing component during the method 300. As such, continuing the example in which the computing component 210 is the memory device discussed above that includes the ECC engine that corrects correctable errors that occur in the memory device, the host processing engine provided by the host processing device 206 may be configured to identify each correctable error that is corrected in the memory device by the ECC engine.

In other examples, the first error threshold may be some plurality of errors such that the host processing engine provided by the host processing device 206 identifies when that number of errors occur in the computing component during the method 300. Continuing with the example in which the computing component 210 is a memory device, the host processing engine provided by the host processing device 206 may be configured to access that memory device periodically (e.g., every 10 minutes, ever hour, every 4 hours, every 12 hours, every 24 hours, etc.) and identify a plurality of errors that have been corrected by the ECC engine in that memory device as described above, and then determine whether that plurality of correctable errors has reached or exceeded the first error threshold (which as discussed above may be a default error threshold, an error threshold set by a user, and/or any other error thresholds that would be apparent to one of skill in the art in possession of the present disclosure). In particular, in some examples a buffer in the memory device may be configured to store the error telemetry data described below for more than one correctable error that has been corrected by the ECC engine, and the first error threshold may be set at that number of correctable errors such that error telemetry data may be collected (as described in further detail below) for multiple correctable errors at the same time.

However, while the two specific examples discussed above describe error identification at block 302 that allows the collection of error telemetry data for every correctable error that occurs in a memory device, one of skill in the art in possession of the present disclosure appreciate how the error identification performed at block 302 may only allow for the collection of error telemetry data for subsets of the errors occurring in the computing component 210 (e.g., subsets of the correctable errors occurring in a memory device) while remaining within the scope of the present disclosure as well. For example, the first error threshold may be set at a number of correctable errors that have been corrected by the ECC engine in the memory device discussed above that is greater than the number of correctable errors for which the buffer in the memory device is configured to store error telemetry data for, and thus error telemetry data may be retrieved for a subset of the correctable errors that have occurred in the memory device.

Furthermore, while a few specific examples have been described, one of skill in the art in possession of the present disclosure will appreciate how the host processing engine provided by the host processing device 206 may identify that the first error threshold has been reached in the computing component 210 in a variety of manners (e.g. the computing component 210 may be configured to notify the host processing engine provided by the host processing device 206 that it has reached the first error threshold described above) that will fall within the scope of the present disclosure as well.

If, at decision block 302, the computing component has not reached the first error threshold, the method 300 returns to decision block 302. As such, the method 300 may loop such that the host processing engine provided by the host processing device 206 monitors the computing component 210 until the number of errors that have occurred in the computing component reaches the first error threshold. As will be appreciated by one of skill in the art in possession of the present disclosure, the embodiments of the method 300 illustrated and discussed herein presume that the first error threshold is either equal to and less than the second error threshold (discussed below), but one of skill in the art in possession of the present disclosure will recognize how the method 300 may be modified if first error threshold greater than the second error threshold (e.g., the method 300 may proceed to decision block 310 (discussed below) in the event the computing component 210 has not reached the first error threshold at decision block 302).

Figure 6:
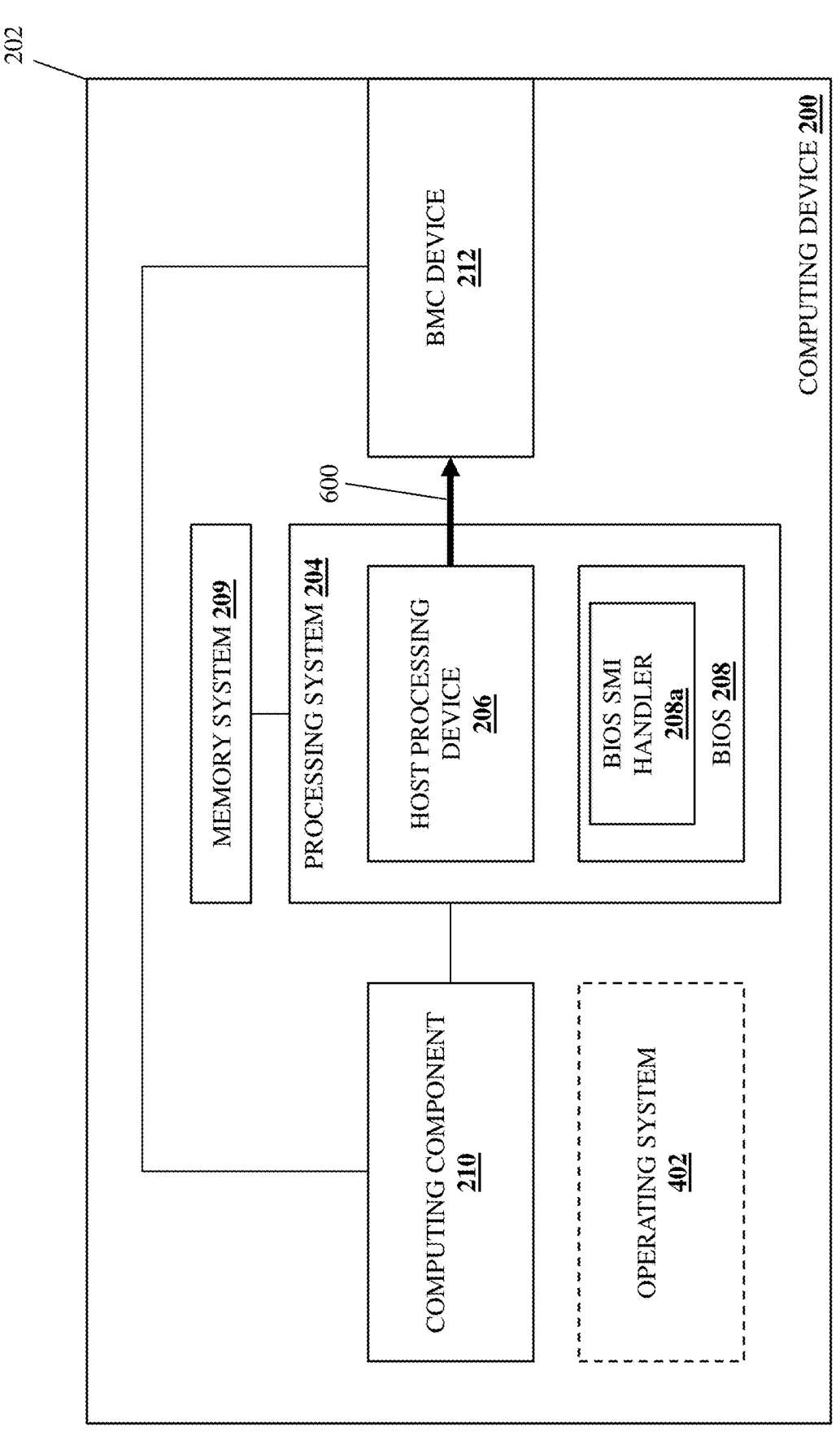
FIG. 6 is a schematic view illustrating an embodiment of the computing device of FIG. 2 operating during the method of FIG. 3.

If, at decision block 302, the computing component has reached the first error threshold, the method 300 proceeds to block 304 where the host processing device notifies a BMC device. With reference to FIG. 6, in an embodiment of block 304 and in response to identifying that the computing component 210 has reached the first error threshold, the host processing engine provided by the host processing device 206 in the processing system 204 may perform BMC device notification operations 600 that include providing a notification to the BMC device 212. For example, at block 304 the host processing engine provided by the host processing device 206 may generate and transmit an interrupt (e.g., via an ERR(0) pin in host processing device 206 and through a Complex Programmable Logic Device (CPLD) to a BMC General Purpose Interface (GPI) on the BMC device 212) and/or any other host processing device/BMC communications to the BMC device 212 that are configured to cause the BMC device 212 to identify that the first error threshold has been reached by the computing component 210 as described below. As will be appreciated by one of skill in the art in possession of the present disclosure, the notification of the BMC device 212 at block 304 does not require the SMIs discussed above, and thus does not result in a need for the host processing device 206 to enter or exit the SMM discussed above. However, while a particular technique for notifying the BMC device 212 to cause the BMC device to identify the first error threshold has been reached by the computing component 210 is described herein, one of skill in the art in possession of the present disclosure will appreciate how other techniques for notifying the BMC device 212 that the computing component 210 has reached the first error threshold (e.g., an explicit notification that the computing component 210 has reached the first error threshold) will fall within the scope of the present disclosure as well.

Figure 7:
FIG. 7 is a schematic view illustrating an embodiment of the computing device of FIG. 2 operating during the method of FIG. 3.

The method 300 then proceeds to block 306 where the BMC device identifies and stores error telemetry data associated with one or more errors that occurred in the computing component. With reference to FIG. 7, in an embodiment of block 306 and in response to being notified by the host processing device 206 at block 304, the BMC engine provided by the BMC device 212 may perform error telemetry data identification and storage operations 700 that include identifying error telemetry data for one or more errors that occurred in the computing component 210, and storing that error telemetry data in a storage device that is accessible to the BMC engine. In examples in which the first error threshold is a single error as described above, and in response to receiving the notification from the host processing engine provided by the host processing device 206, the BMC engine provided by the BMC device 212 may access the computing component 210, determine that an error has occurred in the computing device 210 (e.g., an error occurred in the computing component 210 since the computing device 200 was initialized, an error occurred in the computing component 210 since a most recent check by the BMC engine of an error occurring in the computing component 210, etc.) and, in response, may retrieve error telemetry data for that error from the computing component 210 that identifies details about that error.

Continuing the example in which the computing component 210 is the memory device discussed above that includes the ECC engine that corrects correctable errors that occur in the memory device, at block 306 the BMC engine provided by the BMC device 212 may identify that a correctable error has occurred in the memory device and been corrected by the ECC engine and, in response, may retrieve error telemetry data for that correctable error from a buffer associated with the memory device that identifies a location of that correctable error (e.g., identifiers for the host processing device 206, an Integrated Management Controller (IMC), a memory address, memory address range, memory page, a memory channel, a memory slot, a memory rank, a memory device, a memory bank group, a memory bank, a memory row, a memory column, and/or other memory location information that identifies the location of that correctable error in the memory device), as well any of a variety of error telemetry data that would be apparent to one of skill in the art in possession of the present disclosure.

In examples in which the first error threshold is a plurality of errors as described above, and in response to receiving the notification from the host processing engine provided by the host processing device 206, the BMC engine provided by the BMC device 212 may access the computing component 210, identify a plurality of errors have occurred in the computing device 210, determine that the plurality of errors that have occurred in the computing device 210 have reached or exceeded the first error threshold (e.g., the errors that have occurred in the computing component 210 since the computing device 200 was initialized have reached or exceeded the first error threshold, the errors that have occurred in the computing component 210 since a most recent check by the BMC engine of errors occurring in the computing component 210 have reached or exceeded the first error threshold, etc.) and, in response, may retrieve error telemetry data for one or more of those errors from the computing component 210 that identifies details about those error(s).

Continuing the example in which the computing component 210 is the memory device discussed above that includes the ECC engine that corrects correctable errors that occur in the memory device, at block 306 the BMC engine provided by the BMC device 212 may identify that a plurality of correctable errors have occurred in the memory device and have been corrected by the ECC engine and, in response, may retrieve error telemetry data for one or more of those correctable errors that identifies a location of those correctable error(s) (e.g., identifiers for the host processing device 206, an Integrated Management Controller (IMC), a memory address, memory address range, memory page, a memory channel, a memory slot, a memory rank, a memory device, a memory bank group, a memory bank, a memory row, a memory column, and/or other memory location information that identifies the location of those correctable error(s) in the memory device), as well any of a variety of error telemetry data that would be apparent to one of skill in the art in possession of the present disclosure. As discussed above, in some examples a buffer in the memory device may be configured to store the error telemetry data described below for more than one correctable error that has been corrected by the ECC engine, and thus the error telemetry data retrieved at block 306 may be for error telemetry data for each of the plurality of correctable errors that have occurred in the memory device, or error telemetry data for a subset of the correctable errors that have occurred in the memory device (i.e., when the number of correctable errors that have occurred in the memory device exceeds the number of errors for which error telemetry data may be stored in the buffer of the memory device).

However, while a few specific examples have been described, one of skill in the art in possession of the present disclosure will appreciate how the BMC engine provided by the BMC device 212 may collect error telemetry data in a variety of manners (e.g. the host processing engine provided by the host processing device 206 may identify the location of the error telemetry data for the errors that have occurred in the computing component 210 so that the BMC engine provided by the BMC device 212 may simply retrieve and store it) that will fall within the scope of the present disclosure as well. As will be appreciated by one of skill in the art in possession of the present disclosure, the error telemetry data stored in the BMC device 212 may be retrieved (e.g., via a network) at any time for use in performing analysis of errors that have occurred in the computing component 210 (e.g., correctable errors that have been corrected in the memory device) in order to predict a future computing component failure or other unavailability, perform root cause analysis of a computing component unavailability (e.g., after the computing component has failed or otherwise become unavailable), and/or provide other error analysis that would be apparent to one of skill in the art in possession of the present disclosure.

The method 300 then proceeds to decision block 308 where the method 300 proceeds depending on whether BMC/BIOS dual notification is available. As will be appreciated by one of skill in the art in possession of the present disclosure, some embodiments of the present disclosure envision the processing system 204/chipset with hardware capabilities that allow the host processing engine provided by the host processing device 206 to provide notifications to both the BMC device 212 as described above, and provide notifications to the BIOS 208 as described below. However, one of skill in the art in possession of the present disclosure will also appreciate that conventional processing systems/chipsets do not include such hardware capabilities, and are limited to providing notifications like those described herein to either their conventional BIOS or their conventional BMC device. As discussed below and as will be appreciated by one of skill in the art in possession of the present disclosure, embodiments of the present disclosure allow the benefits of the present disclosure to be realized even when such limitations in processing system/chipset hardware capabilities are present. As such, at decision block 308, the method 300 may proceed depending on whether the processing system 206/chipset includes hardware capabilities that allow notifications to both the BIOS 208 and the BMC device 212 (i.e., "BMC/BIOS dual notifications").

Figure 8A:
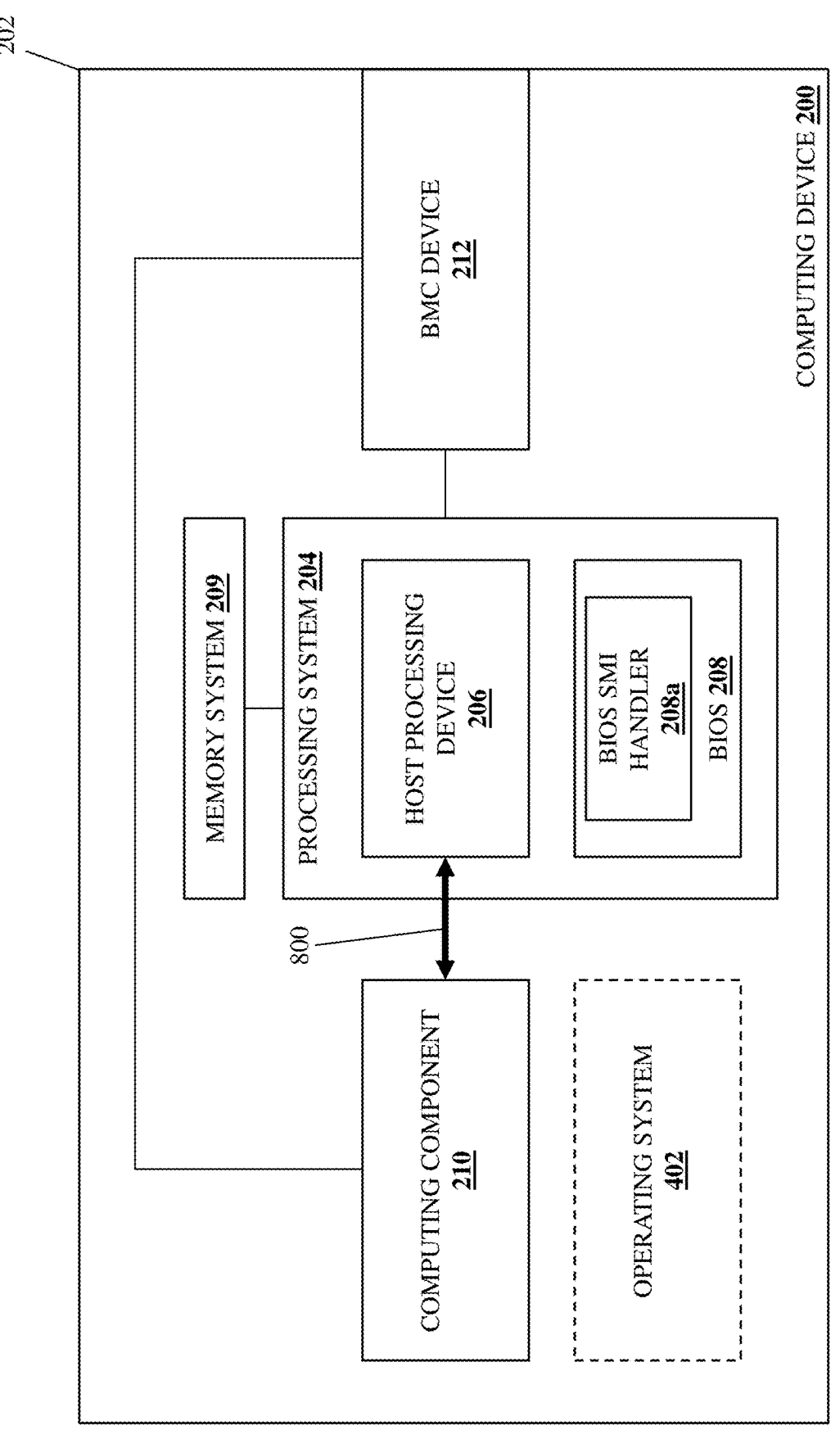
FIG. 8A is a schematic view illustrating an embodiment of the computing device of FIG. 2 operating during the method of FIG. 3.

If, at decision block 308, BMC/BIOS dual notification is available, the method 300 proceeds to decision block 310 where the method 300 proceeds depending on whether the computing component has reached a second error threshold. With reference to FIG. 8A, in an embodiment of decision block 310, the host processing engine provided by the host processing device 206 in the processing system 204 may perform second error threshold identification operations 800 that may include monitoring the computing component 210 to identify whether a plurality of errors that have occurred in the computing component 210 have reached a second error threshold. As will be appreciated by one of skill in the art in possession of the present disclosure, in most embodiments the second error threshold (which may be a default error threshold, an error threshold set by a user, and/or any other error thresholds that would be apparent to one of skill in the art in possession of the present disclosure) will include some plurality of errors in order to reduce the number of SMIs and associated host processing device SMM entries and exits that are performed in conventional RAS systems as described above, and the number of errors required to reach or exceed the second error threshold may be selected to reduce the number of SMIs and associated host processing device SMM entries and exits to a desired level.

As such, in an example in which the computing component 210 is a memory device, the host processing engine provided by the host processing device 206 may be configured to access that memory device periodically (e.g., every 10 minutes, ever hour, every 4 hours, every 12 hours, every 24 hours, etc.) and identify a plurality of errors that have occurred in the memory device and that have been corrected by the ECC engine in that memory device as described above, and then determine whether that plurality of correctable errors has reached or exceeded the second error threshold.

In some embodiments, the first error threshold for the computing component 210 may be the single error described above, while the second error threshold for the computing component 210 may be a plurality of errors (e.g., 64 errors), which as described above ensures that the BMC engine provided by the BMC device 212 will collect error telemetry data for every error that occurs in the computing component 210 (e.g., particularly in situations in which a buffer that stores that error telemetry data is only capable of storing error telemetry data for one error, i.e., the most recent error that has occurred in the computing component 210), and as described below allows the BIOS 208 to log the occurrence of a plurality of errors in the computing component 210 reaching the second error threshold while limiting the number of SMIs and associated host processing device SMM entries/exits. However, one of skill in the art in possession of the present disclosure will appreciate how the number of errors required to reach the first error threshold and the second error threshold may be modified based on different RAS considerations for the computing component 210 and the computing device 200 while remaining within the scope of the present disclosure as well.

Furthermore, while a few specific examples have been described, one of skill in the art in possession of the present disclosure will appreciate how the host processing engine provided by the host processing device 206 may identify that the second error threshold has been reached in the computing component 210 in a variety of manners (e.g. the computing component 210 may be configured to notify the host processing engine provided by the processing device 206 that it has reached the second error threshold) that will fall within the scope of the present disclosure as well.

If, at decision block 310, the computing component has not reached the second error threshold, the method returns to decision block 302. As such, the method 300 may loop such that the host processing engine provided by the host processing device 206 continues to determine whether the computing component 210 has reached the first error threshold, notifies the BMC device 212 to cause it to identify and store error telemetry data for errors that occur in the computing component 210 when the computing component 210 reaches the first error threshold, and continues to determine whether the computing component 210 has reached the second error threshold until the computing component 210 reaches the second error threshold.

Figure 8B:
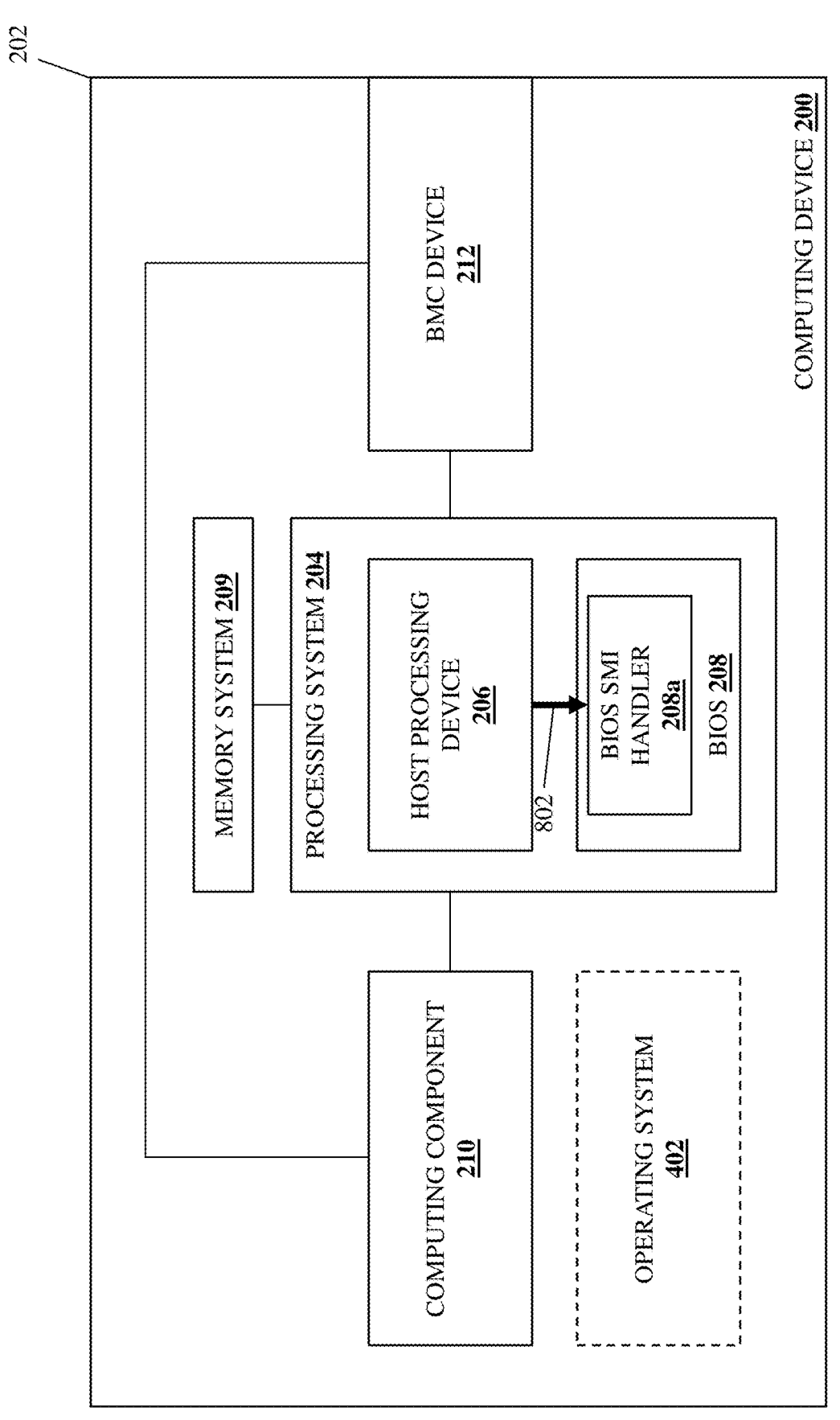
FIG. 8B is a schematic view illustrating an embodiment of the computing device of FIG. 2 operating during the method of FIG. 3.

If, at decision block 310, the computing component has reached the second error threshold, the method 300 proceeds to block 312 where the host processing device notifies the BIOS. With reference to FIG. 8B, in an embodiment of block 312 and in response to identifying that the computing component 210 has reached the second error threshold, the host processing engine provided by the host processing device 206 in the processing system 204 may perform BIOS notification operations 802 that include providing a notification to the BIOS 208. For example, at block 312 the host processing engine provided by the host processing device 206 may generate a System Management Interrupt (SMI) that is handled by the BIOS SMI handler 208a and that is configured to cause the BIOS 208 to identify that the second error threshold has been reached by the computing component 210 as described below, and as discussed above the second error threshold may be configured to limit the number of SMIs generated by the host processing device 206. As will be appreciated by one of skill in the art in possession of the present disclosure, while illustrated as occurring separately, in some situations the notification of the BMC device 212 and the BIOS 208 at blocks 304 and 312 may be performed at the same (or substantially the same) time (e.g., when the first error threshold and the second error threshold are the same or happen to coincide and cause the host processing engine provided by the host processing device 206 to perform blocks 304 and 316 at the same (or substantially the same) time).

Returning to decision block 308, if BMC/BIOS dual notification is not available, the method 300 proceeds to decision block 314 where the method 300 proceeds depending on whether the computing component has reached a second error threshold. In an embodiment, at decision block 314, the BMC engine provided by the BMC device 212 may perform second error threshold identification operations that may include identifying whether a plurality of errors that have occurred in the computing component 210 have reached a second error threshold. In some examples, the second error threshold identification operations may be performed as part of the error telemetry data identification and storage operations 700 (e.g., the identification of the error telemetry data for the error(s) that have occurred in the computing component 210 may include identifying whether the errors that have occurred in the computing component 210 have reached or exceeded the second error threshold), but one of skill in the art in possession of the present disclosure will appreciate how the BMC engine provided by the BMC device 212 may perform separate, second error threshold identification operations at block 314 while remaining within the scope of the present disclosure as well.

Similarly as described above, in most embodiments the second error threshold (which may be a default error threshold, an error threshold set by a user, and/or any other error thresholds that would be apparent to one of skill in the art in possession of the present disclosure) will include some plurality of errors in order to reduce the number of SMIs and associated host processing device SMM entries and exits, and the number of errors required to reach or exceed the second error threshold may be selected to reduce the number of SMIs and associated host processing device SMM entries and exits to a desired level.

As such, in another example in which the computing component 210 is a memory device and similarly as described above, the BMC engine provided by the BMC device 212 may be configured to identify a plurality of errors that have occurred in the memory device and have been corrected by the ECC engine in that memory device as described above, and then may determine whether that plurality of correctable errors has reached or exceeded the second error threshold (which as discussed above may be a default error threshold, an error threshold set by a user, and/or any other error thresholds that would be apparent to one of skill in the art in possession of the present disclosure). However, while a few specific examples have been described, one of skill in the art in possession of the present disclosure will appreciate how the BMC engine provided by the BMC device 212 may identify that the second error threshold has been reached in the computing component 210 in a variety of manners (e.g. the computing component 210 may be configured to notify the BMC engine provided by the BMC device 212 that it has reached the second error threshold) that will fall within the scope of the present disclosure as well.

If, at decision block 314, the computing component has not reached the second error threshold, the method 300 returns to decision block 302. As such, the method 300 may loop such that the host processing engine provided by the host processing device 206 continues to determine whether the computing component 210 has reached the first error threshold, and notifies the BMC device 212 to cause it to identify and store error telemetry data for errors that occur in the computing component 210 when the computing component 210 reaches the first error threshold, while the BMC engine provided by the BMC device 212 continues to determine whether the computing component 210 has reached the second error threshold until the computing component 210 reaches the second error threshold.

Figure 9:
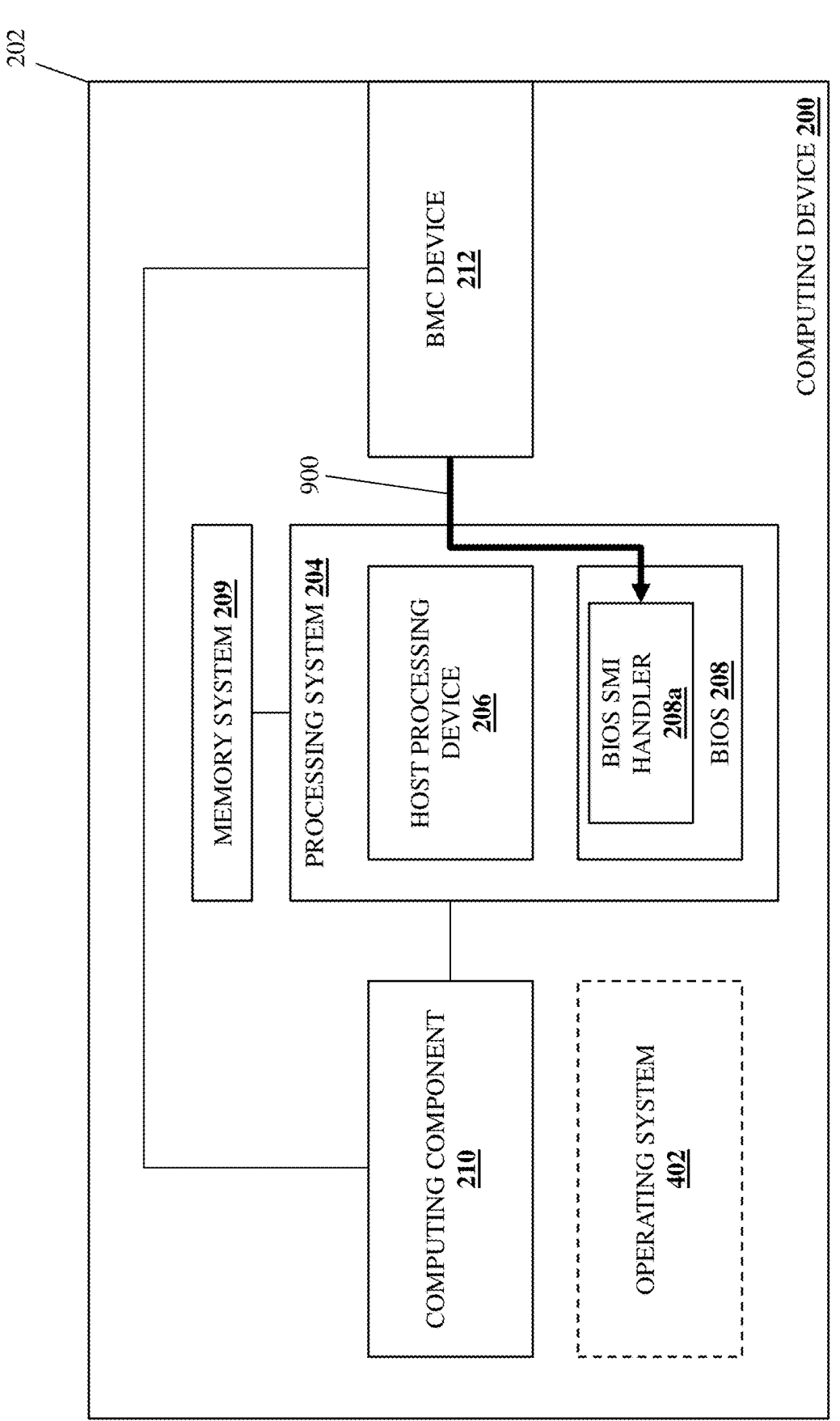
FIG. 9 is a schematic view illustrating an embodiment of the computing device of FIG. 2 operating during the method of FIG. 3.
Figure 10:
FIG. 10 is a schematic view illustrating an embodiment of the computing device of FIG. 2 operating during the method of FIG. 3.

If, at decision block 314, the computing component has reached the second error threshold, the method 300 proceeds to block 316 where the BMC device notifies the BIOS. With reference to FIG. 9, in an embodiment of block 316 and in response to identifying that the computing component 210 has reached the second error threshold, the BMC engine provided by the BMC device 212 may perform BIOS notification operations 802 that include providing a notification to the BIOS 208. For example, at block 316 the BMC engine provided by the BMC device 212 may generate a System Management Interrupt (SMI) that is handled by the BIOS SMI handler 208a and that is configured to cause the BIOS 208 to identify that the second error threshold has been reached by the computing component 210 as described below, and as discussed above the second error threshold may be configured to limit the number of SMIs provided by the BMC device 212 to the BIOS 208.

As such, in the specific example in which the first error threshold for the memory device is the single error described above and the second error threshold for the memory device is a plurality of errors (e.g., 64 errors), the BMC engine provided by the BMC device 212 will collect error telemetry data for every error that occurs in the memory device, while notifying the BIOS 208 to cause the BIOS 208 to identify the occurrence of a plurality of errors in the memory device reaching the second error threshold in order to limit the number of SMIs and associated host processing device SMM entries/exits. However, as discussed above, the number of errors required to reach the first error threshold and the second error threshold may be modified based on different RAS considerations for the computing component 210 and the computing device 200 while remaining within the scope of the present disclosure as well.

Following block 312 or block 316, the method 300 then proceeds to block 318 where the BIOS identifies and logs that the computing component has reached the second error threshold. In an embodiment, at block 318 and in response to being notified by the host processing device 206 or the BMC device 212, the BIOS 208 may perform second error threshold identification operations 1000 that include identifying that the computing component 210 has reached the second error threshold, and second error threshold logging operations 1002 that include logging the occurrence of the second error threshold in the BMC device 212.

In an embodiment, at block 318 and in response to the SMI generated by the host processing engine provided by the host processing device 206 or the BMC engine provided by the BMC device 212, the BIOS engine provided by the BIOS 208 may access the computing component 210, identify a plurality of errors have occurred in the computing device 210, determine that the plurality of errors that have occurred in the computing device 210 have exceeded the second error threshold (e.g., the errors that have occurred in the computing component 210 since the computing device 200 was initialized have reached or exceeded the second error threshold, the errors that have occurred in the computing component 210 since a most recent check by the BIOS engine of errors occurring in the computing component 210 have reached or exceeded the second error threshold, etc.) and, in response, may log the occurrence of the computing component reaching or exceeding the second error threshold in the BMC device 212. Continuing the example in which the computing component 210 is the memory device discussed above that includes the ECC engine that corrects correctable errors that occur in the memory device, at block 318 the BIOS engine provided by the BIOS 208 may identify that a plurality of correctable errors that have occurred in the memory device and that have been corrected by the ECC engine have exceeded the second error threshold and, in response, may log the occurrence of that plurality of correctable errors exceeding the second error threshold in the BMC device 212 (e.g., an "error threshold exceeded" log entry associated with the memory device).

Figure 11:
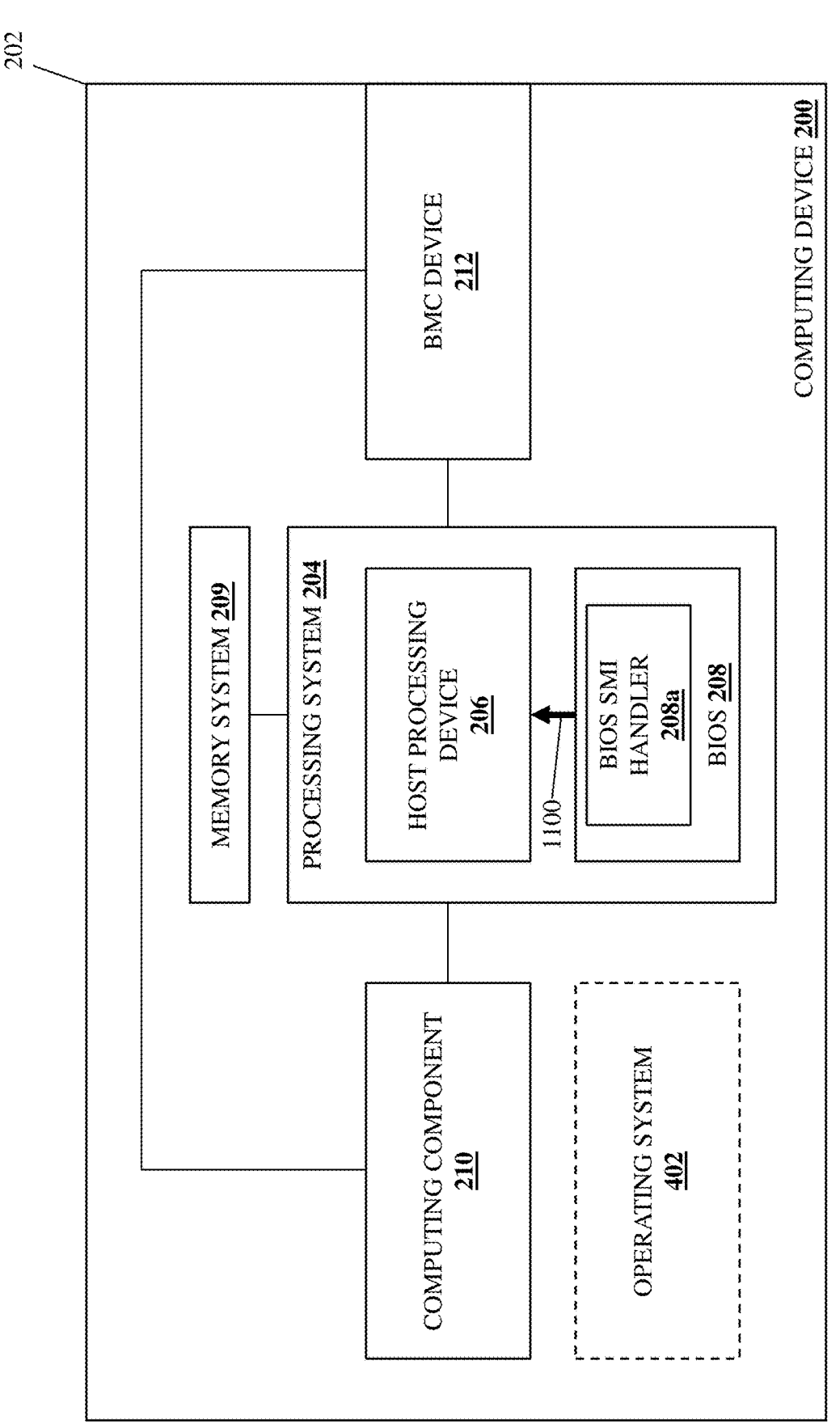
FIG. 11 is a schematic view illustrating an embodiment of the computing device of FIG. 2 operating during the method of FIG. 3.

The method 300 may then proceed to optional block 320 where the BIOS may transmit an error warning message to the host processing device. With reference to FIG. 11, in an embodiment of optional block 320, the BIOS 208 may perform error warning message transmission operations 1100 that include transmitting an error warning message to the host processing engine provided by the host processing device 206 that is configured to cause the host processing device 206 to perform one or more host processing device error threshold actions. For example, in some situations the reaching of the second error threshold by the computing component may be associated with a policy to instruct the host processing device to perform one or more host processing device error threshold actions (e.g., the reaching of the second error threshold one or more times over one or more iterations of the method 300 may be associated with a policy to perform the host processing device error threshold actions), and thus the identification by the BIOS 208 that the computing component has reached the second error threshold may cause the BIOS 208 to transmit the error warning message to the host processing device 206 at optional block 320 to cause the host processing device 206 to perform those host processing device error threshold action(s).

Continuing with the example in which the computing component 210 is a memory device, the second error threshold may be associated with error threshold actions such as memory mirroring (e.g., mirroring the data stored on the memory device to another memory device), memory sparing (configuring another memory device to be available to store data for the memory device, etc.), and/or otherwise configuring another memory device as a backup for that memory device, and thus the error warning message may be configured to cause the host processing engine provided by the host processing device 206 to use the host processing device 206 to perform such memory mirroring actions, memory sparing actions, or other memory device data backup actions.

Figure 12:
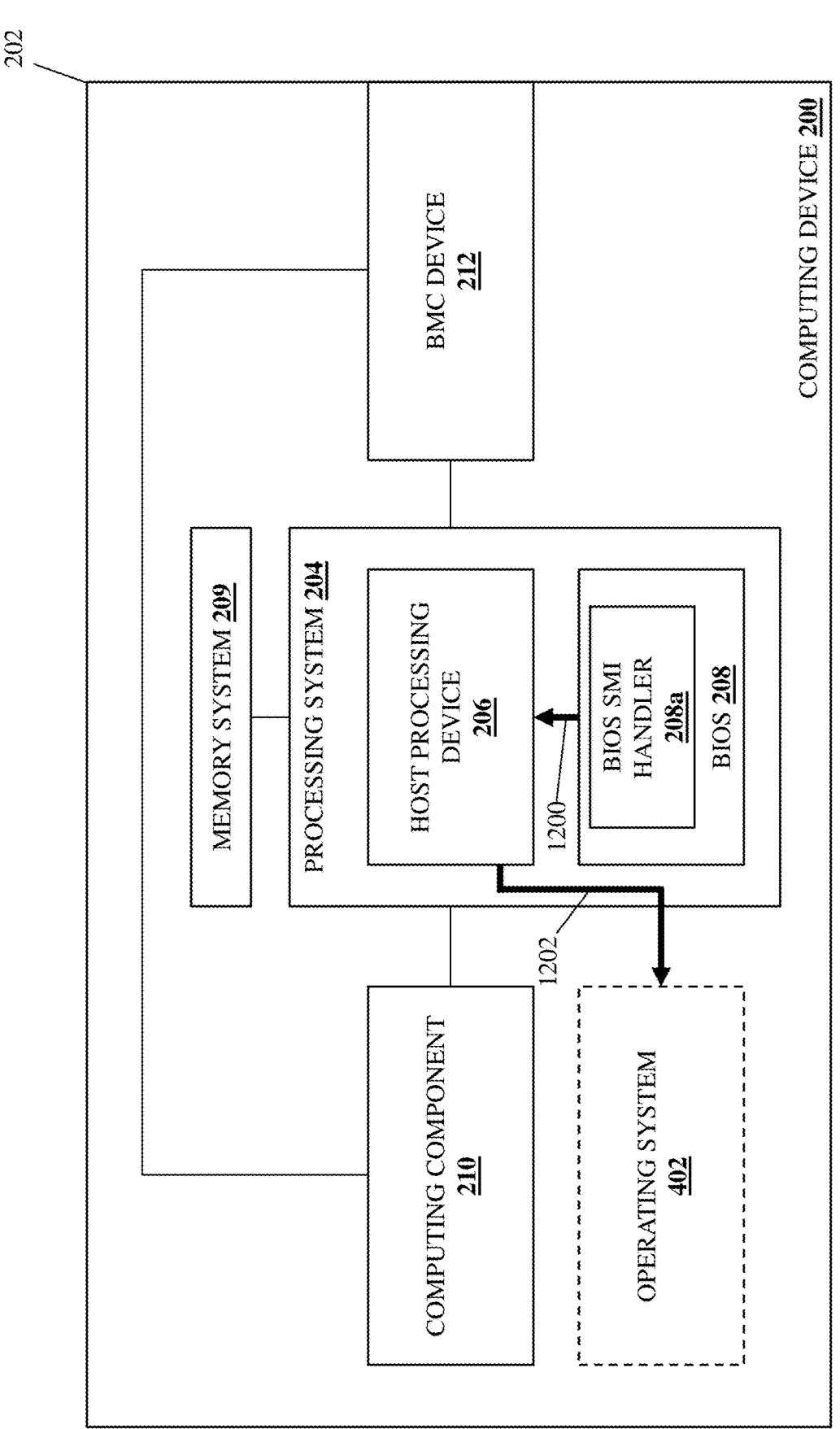
FIG. 12 is a schematic view illustrating an embodiment of the computing device of FIG. 2 operating during the method of FIG. 3.

With reference to FIG. 12, in an embodiment of optional block 320, the BIOS 208 may perform error warning message transmission operations 1200 that include transmitting an error warning message to the host processing engine provided by the host processing device 206 that is configured to cause the host processing engine to configure the operating system 402 to perform one or more operating system error threshold actions. For example, in some situations the reaching of the second error threshold by the computing component may be associated with a policy to have the operating system 402 perform one or more operating system error threshold actions (e.g., the reaching of the second error threshold one or more times over one or more iterations of the method 300 may be associated with a policy to perform the operating system error threshold actions), and thus the identification by the BIOS 208 that the computing component has reached the second error threshold may cause the BIOS 208 to transmit the error warning message to the host processing device at optional block 320 to cause the host processing device to configure the operating system to perform those operating system error threshold action(s).

Continuing with the example in which the computing component 210 is a memory device, the second error threshold may be associated with error threshold actions such as page off-lining (e.g., configuring the memory device to prevent access the page in which the error occurred), Post Package Repair (PPR) (e.g. repairing the memory device to eliminate the occurrence of the error), and/or other operating system error threshold actions known in the art, and thus the error warning message may be configured to cause the host processing engine provided by the host processing device 206 to use the host processing device 206 to perform such page off-lining actions, PPR actions, or other operating system error threshold actions.

The method 300 may then proceed to optional block 322 where the host processing device may perform one or more error threshold actions. In an embodiment, at optional block 322 and in response to receiving the error warning message, the host processing engine provided by the host processing device 206 may use the host processing device 206 to perform error threshold actions (e.g., the memory mirroring actions, memory sparing actions, or other memory device data backup actions described above in the specific example in which the computing component 210 is a memory device). With reference to FIG. 12, in an embodiment of optional block 322 and in response to receiving the error warning message, the host processing engine provided by the host processing device 206 may perform error threshold action operations 1202 that include configuring the operating system 402 to perform error threshold actions (e.g., the page off-lining actions or PPR actions described above in the specific example in which the computing component 210 is a memory device). The method 300 may then return to decision block 302. As such, the method 300 may loop such that the BMC device 212 identifies and stores error telemetry data for errors occurring in the computing component 210, while BIOS 208 identifies and logs when the computing component 210 reaches error thresholds (e.g., the BIOS 208 may log each time the second error threshold is reached by the computing component 210 over multiple iterations of the method 300).

Thus, systems and methods have been described that provide for the performance of RAS operations by a BMC and a BIOS in a computing device, and particularly to the BMC identifying and storing error telemetry data for errors occurring in a computing component while the BIOS identifies and logs when the computing component reaches error threshold(s). For example, the BMC/BIOS RAS system of the present disclosure may include a computing device having a processing system coupled to a BMC device and a computing component. A host processing device in the processing system identifies that the computing component has reached a first error threshold and, in response, notifies the BMC device. In response to being notified, the BMC device identifies and stores error telemetry data associated with at least one error that occurred in the computing component. One of the host processing device or the BMC device identifies that the computing component has reached a second error threshold and, in response, notifies a BIOS included in the processing system. In response to being notified the BIOS identifies and logs that the computing component has reached the second error threshold. As such, SMIs and associated CPU SMM entries/exits to perform RAS operations are reduced while collecting error information that enables the analysis of errors that allows the prediction of future computing component unavailability, root cause analysis of computing component unavailability, and/or other error analysis results.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Baseboard Management Controller (BMC)/Basic Input/Output System (BIOS) Reliability, Availability, and Serviceability (RAS) system, comprising:
   a computing device;
   a computing component included in the computing device;
   a Baseboard Management Controller (BMC) device included in the computing device; and
   a processing system that is included in the computing device and coupled to the computing component and the BMC device, wherein the processing system includes a host processing device that is configured to:
      identify that the computing component has reached a first error threshold; and
      notify, in response to identifying that the computing component has reached the first error threshold, the BMC device, wherein the BMC device is configured to:
         identify and store, in response to being notified, error telemetry data associated with at least one error that occurred in the computing component, and wherein one of the host processing device or the BMC device is configured to:
            identify that the computing component has reached a second error threshold; and
            notify, in response to identifying that the computing component has reached the second error threshold, a Basic Input/Output System (BIOS) that is included in the processing system, wherein the BIOS is configured to:
               identify and log, in response to being notified, that the computing component has reached the second error threshold.

2. The system of claim 1, wherein the first error threshold is different than the second error threshold.

3. The system of claim 2, wherein the first error threshold is one error, and wherein the second error threshold is a plurality of errors.

4. The system of claim 1, wherein the computing component is a memory device.

5. The system of claim 1, wherein the BIOS is configured to:
   transmit, in response to being notified, an error warning message to the host processing device, and wherein the host processing device is configured to:
      perform, in response to receiving the error warning message, an error threshold action.

6. The system of claim 1, wherein the error telemetry data identifies a location of the at least one error that occurred in the computing component.

7. An Information Handling System (IHS), comprising:
   a processing system including a host processing device and a Basic Input/Output System (BIOS); and
   a memory system that is coupled to the processing system and that includes instructions that, when executed by the host processing device, cause the host processing device to provide a host processing engine that is configured to:
      identify that a computing component that is coupled to the processing system has reached a first error threshold;
      notify, in response to identifying that the computing component has reached the first error threshold, a Baseboard Management Controller (BMC) device that is coupled to the processing system to cause the BMC device to identify and store error telemetry data associated with at least one error that occurred in the computing component;
      identify that the computing component has reached a second error threshold; and
      notify, in response to identifying that the computing component has reached the second error threshold, the BIOS, wherein memory system includes instructions that, when executed by the BIOS, cause the BIOS to provide a BIOS engine that is configured to:
         identify and log, in response to being notified, that the computing component has reached the second error threshold.

8. The IHS of claim 7, wherein the first error threshold is different than the second error threshold.

9. The IHS of claim 8, wherein the first error threshold is one error, and wherein the second error threshold is a plurality of errors.

10. The IHS of claim 7, wherein the computing component is a memory device.

11. The IHS of claim 7, wherein the BIOS engine is configured to:
   transmit, in response to being notified, an error warning message to the host processing engine, and wherein the host processing engine is configured to:
      perform, in response to receiving the error warning message, an error threshold action.

12. The IHS of claim 11, wherein the error threshold action includes at least one of:
   configuring a backup component for the computing component; and
   preventing, via an operating system provided by the host processing device, access to at least a portion of the computing component that is associated with the error.

13. The IHS of claim 7, wherein the error telemetry data identifies a location of the at least one error that occurred in the computing component.

14. A method for performing Reliability, Availability, and Serviceability (RAS) operations using a Baseboard Management Controller (BMC) and a Basic Input/Output System (BIOS) in a computing device, comprising:
   identifying, by a host processing device in a processing system, that a computing component that is coupled to the processing system has reached a first error threshold;
   notifying, by the host processing device in response to identifying that the computing component has reached the first error threshold, a Baseboard Management Controller (BMC) device that is coupled to the processing system;

identifying and storing, by the BMC device, error telemetry data associated with at least one error that occurred in the computing component;

identifying, by the one of the host processing device or the BMC device, that the computing component has reached a second error threshold;

notifying, by one of the host processing device or the BMC device in response to identifying that the computing component has reached the second error threshold, the BIOS; and identifying and logging, by the BIOS in response to being notified, that the computing component has reached the second error threshold.

15. The method of claim 14, wherein the first error threshold is different than the second error threshold.

16. The method of claim 15, wherein the first error threshold is one error, and wherein the second error threshold is a plurality of errors.

17. The method of claim 14, wherein the computing component is a memory device.

18. The method of claim 14, further comprising:

transmitting, by the BIOS in response to being notified, an error warning message to the host processing device; and performing, by the host processing device in response to receiving the error warning message, an error threshold action.

19. The method of claim 14, wherein the error threshold action includes at least one of:

configuring a backup component for the computing component; and preventing, via an operating system provided by the host processing device, access to at least a portion of the computing component that is associated with the error.

20. The method of claim 14, wherein the error telemetry data identifies a location of the at least one error that occurred in the computing component.

\* \* \* \* \*